Figure 1:
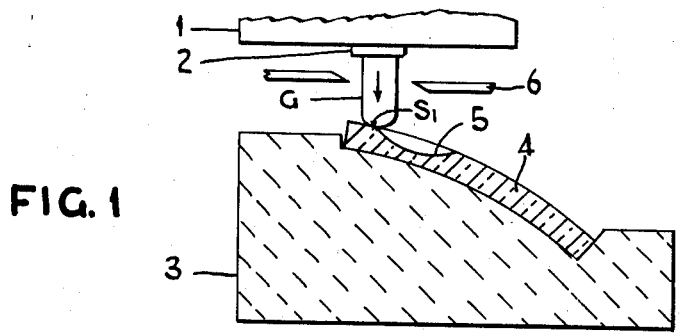

Feb. 14, 1956 W. W. POUNDSTONE 2,734,315
METHOD OF FORMING FUSED BIFOCAL LENS BLANKS
Filed Feb. 11, 1954 2 Sheets-Sheet 1

INVENTOR.
WILLIAM W. POUNDSTONE
BY
Oscar L. Spencer
ATTORNEY

United States Patent Office 2,734,315
Patented Feb. 14, 1956

2,734,315

METHOD OF FORMING FUSED BIFOCAL LENS BLANKS

William W. Poundstone, Pittsburgh, Pa., assignor to Pittsburgh Plate Glass Company, Allegheny County, Pa., a corporation of Pennsylvania Application February 11, 1954, Serial No. 409,698

5 Claims. (Cl. 49—82.1)

This application pertains to a method for forming a fused bifocal lens blank and more specifically to the method for forming and fusing a minor element of the lens to the major element by depositing molten glass of a suitable composition upon the polished surface of the countersink in the major element without entrapment of air at the fusion interfaces and impairment of the curvature of the countersink surface.

Present day commercial practices in forming fused bifocal lens blanks comprise separately forming the major and minor elements of the blank, grinding and polishing a suitable countersink in the major element to receive the minor element, grinding and polishing one surface of the minor element to a contour approximately that of the countersink in the major element, assembling the elements with the polished surfaces opposing each other and heating the assembly to fuse the elements together in their area of contact. These fused bifocal lens blanks are then subsequently ground and polished to the requirements of the user.

The prior art contains many examples of attempts to fuse previously prepared elements of a bifocal lens blank without entrapping air at the interfaces in the area of fusion. Some examples of the prior art necessitated deformation of the curvature of the polished surface of one element in order to seat it within the countersink of the other element in attempts to avoid entrapment of air during the final fusion operation. The present invention avoids this and other difficulties by flowing and fusing the glass of the minor element directly onto the prepared countersink therefor in the major element.

I have observed that a descending stream of molten glass deposited adjacent an edge of the countersink in the major element will flow into and across the contoured surface of the countersink so as to fuse therewith and maintain the original curvature of the countersink. Molten glass deposited in this manner fuses with the surface of the countersink without entrapment of air or gases.

In practicing my invention, the glass major element of the fused bifocal blank may be any of the well known optical crown type glasses having the required index of refraction and curve of the countersink therein which combine with the index of refraction of the minor element glass to introduce the desired added power throughout the reading field of the bifocal lens in accordance with standard practice in the art. The minor element glass may be any of the well known barium or flint types having higher indices of refraction than the crown glass of the major element and usually have lower softening points.

An object of the present invention is to form a fused bifocal lens blank by depositing molten glass forming the minor element into a suitable countersink prepared within the major element.

Another object of the invention is to provide a method of forming a fused bifocal lens blank by first preparing a suitable countersink in the major element of the blank and then flowing molten glass, to form the minor element, directly into the countersink without entrapment of air between the entering glass and the finished face of the countersink.

A further object of the invention is to provide a method of forming a fused bifocal lens blank by first preparing a suitable countersink in the major element and flowing molten glass, forming the minor element, directly into the countersink for fusion thereto without distortion of the countersink curvature.

These and other objects will be made apparent as the description proceeds.

Figure 2:
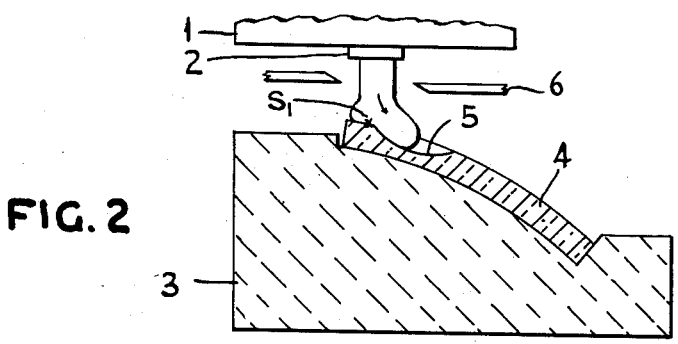
Figure 3:
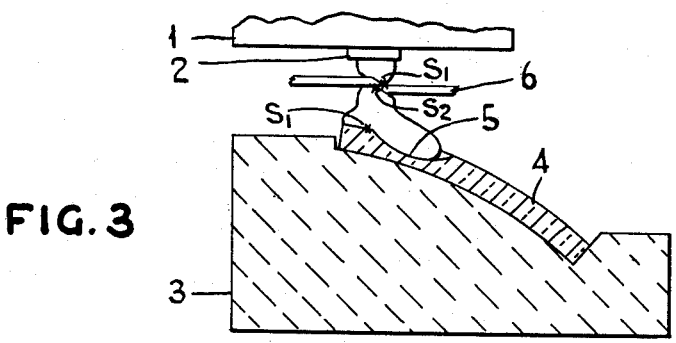
Figure 4:
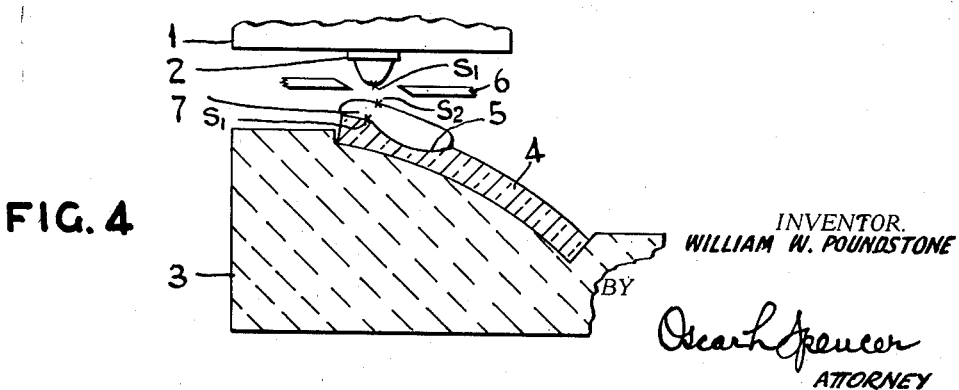
Figure 5:
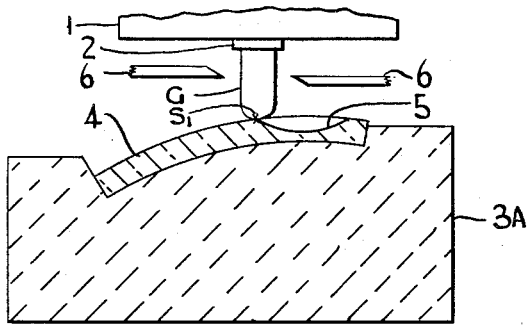
Figure 6:
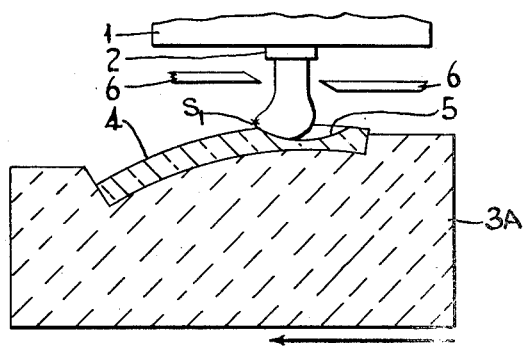
Figure 7:
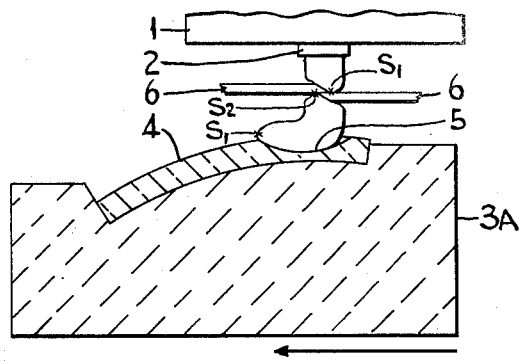
Figure 8:
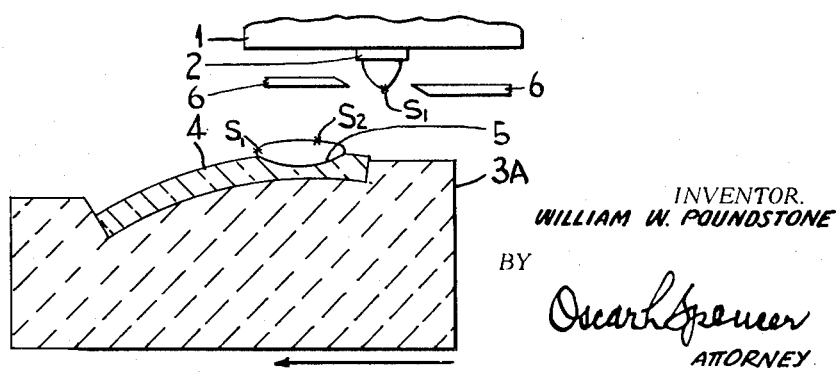

Referring now to the drawings forming part of this specification: Fig. 1 is a schematic arrangement of a glass melting tank, the discharge orifice thereof with the molten glass issuing therefrom, and a lens blank major element with a suitably prepared countersink positioned to receive the molten glass; Fig. 2 is a similar view illustrating the manner of flowing the molten glass of the minor element into the countersink; Fig. 3 is a similar view with the countersink substantially filled by the molten glass and the stream of glass being interrupted by the shears; and Fig. 4 is a view showing the glass flow after being interrupted by the shears, with the assembly ready to be removed and a new major element moved beneath the glass stream for repeating the operation. Figs. 5 to 8 inclusive illustrate a modification of the invention wherein the major element provided with a countersink is moved transversely of the stream of flowing glass to facilitate deposition of the molten glass within the countersink.

Referring now in detail to the drawings, reference character 1 indicates a suitable melting furnace for preparing the minor element glass and having a discharge opening 2 through which the molten glass G issues. Disposed beneath the furnace orifice 2 is a suitable holder 3 upon which is mounted a previously formed major element 4 having a suitable countersink 5 prepared therein for reception of the molten glass forming the minor element 7 to be fused thereto. Adjacent the furnace orifice 2 are suitably mounted shears 6 adapted to selectively intercept the stream of glass G issuing out of the orifice when the countersink 5 in the lens element 4 is filled with molten glass.

As illustrated in Fig. 1 of the drawings, the major element 4 of the lens blank is mounted so that the countersink 5 therein is inclined downwardly from the horizontal to facilitate flow of the molten glass across the contoured surface of the countersink. This major element 4 may be formed by any suitable means and the curvature of the countersink prepared therein is in accordance with standard practice. The countersink may be formed in any suitable manner. The major element 4 is preferably heated to a suitable temperature, below the softening point, to avoid breakage from thermal shock when the molten glass is flowed into the countersink 5.

When the glass flowing out of the furnace orifice 2 is intercepted by the shears, shearing scars $S_1$ and $S_2$ will be formed on the two newly formed surfaces of the glass above and below the shear. It is desirable to avoid having these shearing scars appear either upon the surface of the countersink 5 in the finished lens or within any portion of the blank which is not subjected to subsequent grinding. The holder 3 is initially so positioned that the first shearing scar $S_1$ deposited will impinge upon an area of the major segment 4 which is not included within the ground and polished surface and hence is removed during final grinding and polishing of the fused bifocal lens.

Referring now to Fig. 1 of the drawings, the descending column of molten glass strikes the major element 4 so as to deposit its shear scarred portion $S_1$ adjacent that edge of the inclined countersink 5 which is at the highest level. The molten glass flowing downwardly into the countersink moves downwardly into and across the inclined countersink and fuses with the base thereof without entrapment of air or gases at the interface. This action is shown in Fig. 2 of the drawings. In Fig. 3 of the drawings, the descending column of glass G has substantially filled the countersink and the shear blades 6 are being advanced to sever the glass. This is done at a time when the volume of glass flowing across the major element is in excess of that required to fill the countersink. Fig. 4 illustrates conditions immediately after the shearing operation. New shear mark $S_2$ is formed upon the upper surface of the deposited glass in a position to be ground away during the final finishing operation of the lens. Shearing scar $S_1$ is again formed on the descending glass column. After the glass has been severed, the holder 3 is advanced and a new holder with a new heated major element 4 having a countersink 5 therein is positioned beneath the descending stream of molten glass as before and the operation repeated.

Referring now to Figs. 5 to 8 inclusive of the drawings wherein a modification of the invention is disclosed, the apparatus is substantially that of the previously described Figs. 1 to 4, with the exception that the holder 3A is so formed as to position the heated major element 4 with the base of the countersink 5 therein substantially horizontal to the perpendicularly descending column of molten glass. Here the descending column of glass G again strikes the major element 4 so as to deposit its shear scar $S_1$ adjacent an edge of the countersink and the adjacent molten glass flows freely into the countersink 5. The holder 3A is then moved to the left at a rate causing the accumulating glass to move across the surface of the countersink and fuse therewith. After a suitable interval when the countersink is substantially filled, the shears 6 are advanced severing the stream so that the glass deposited in the countersink 5 assumes the shape shown in Fig. 8 of the drawings. The operation is then repeated by positioning another holder 3A with a major element 4 thereon to receive the descending stream of molten glass.

The relative melting and softening points of the elements forming the fused bifocal blank of the invention are not as critical as in prior art practices. The major element should initially be at a temperature to avoid thermal shock. The rate at which the glass flows into the countersink 5 and the small volume of glass deposited are such that the relatively large area of the major element 4 and holder 3 dissipates the heat before distortion of the countersink takes place.

This application is a continuation-in-part of my copending application Serial No. 332,815, filed January 23, 1953.

I claim:

1. A method of fusing a minor element into a prepared countersink of the major element of a fused bifocal lens blank comprising the steps of, mounting the major element with its countersink facing upwardly for linear movement relative to a descending stream of molten glass, interrupting the stream by shearing above the horizontal plane of movement of the mounted major element, moving the major element beneath the sheared stream of molten glass so that the initial shear mark on the descending stream of molten glass impinges upon the major element adjacent and outside an edge of the countersink therein, flowing the stream across and fusing it with the surface of the countersink in filling same, shearing the stream of glass after the countersink is suitably filled whereby the shear mark is deposited above the level of the finished lens surface and then removing the major element from beneath the stream of molten glass.

2. A method of forming and fusing a minor element into the countersink of a major element of a multifocal lens blank which comprises establishing a downward flowing vertical stream of molten glass, shearing the stream, positioning the major element with the countersink facing upwardly and inclined with respect to the horizontal beneath the sheared stream so that the stream first impinges on the major element outside the countersink adjacent that edge thereof which is at the highest level, continuing the flow until the volume of molten glass is in excess of that required to fill the countersink, again shearing the stream and removing the blank so formed.

3. A method of forming and fusing a minor element into the countersink of a major element of a multifocal lens blank which comprises establishing a downward flowing vertical stream of molten glass, shearing the stream, positioning the major element with the countersink facing upwardly beneath the sheared stream at a location such that the stream first impinges on the major element outside the countersink adjacent an edge thereof, continuing the flow while directing the stream of glass into and across the countersink until the volume of molten glass is in excess of that required to fill the countersink, again shearing the stream and removing the blank so formed.

4. A method of forming and fusing a minor element into a ground and polished countersink within a major element of a multifocal lens blank comprising the steps of establishing a continuous flowing stream of molten glass, shearing the stream, directing the sheared face of the stream upon the major element in such a manner as to impinge thereon at one edge of the countersink, directing the continuing flow across the countersink toward an opposite edge thereof until the flow is in excess of the volume required to fill the countersink and again shearing the stream.

5. A method of forming and fusing a minor element into the countersink of a major element of a multifocal lens blank which comprises establishing a downward flowing stream of molten glass, shearing the stream, positioning the major element with the countersink facing upwardly beneath the sheared stream at a location such that the stream first impinges on the major element outside the countersink adjacent one edge thereof, continuing the flow while moving the major element relative to the stream in such a manner as to direct the stream across the countersink toward the opposite edge while filling the same, again shearing the stream when the volume of molten glass flowing across the major element is in excess of that required to fill the countersink and removing the blank so formed.

References Cited in the file of this patent

UNITED STATES PATENTS

| 865,363 | Dieckmann | Sept. 10, 1907 |
| 869,938 | Schwinzer | Nov. 5, 1907 |
| 1,734,428 | Haering | Nov. 5, 1929 |
| 1,907,810 | Hill | May 9, 1933 |
| 2,145,351 | Hazelton | Jan. 31, 1939 |
| 2,223,382 | Morehead | Dec. 3, 1940 |
| 2,271,004 | Gray | Jan. 27, 1942 |

FOREIGN PATENTS

| 303,588 | Germany | Feb. 7, 1918 |